United States Patent [19]

Murtland, Jr.

[11] Patent Number: 4,630,477
[45] Date of Patent: Dec. 23, 1986

[54] THERMISTOR LIQUID-LEVEL SENSING PROBE

[76] Inventor: James B. Murtland, Jr., 441 SE. 15th Ave., Pompano Beach, Fla. 33060

[21] Appl. No.: 567,162
[22] Filed: Dec. 30, 1983
[51] Int. Cl.⁴ ............................................. G01F 23/24
[52] U.S. Cl. ........................................ 73/295; 338/28
[58] Field of Search ................... 73/295; 338/229, 28; 374/185, 165

[56] References Cited

U.S. PATENT DOCUMENTS

| | | | |
|---|---|---|---|
| 3,144,629 | 8/1964 | Curby | 338/28 |
| 3,153,769 | 10/1964 | Moses | 338/28 |
| 3,181,557 | 5/1965 | Lannan | 73/295 |
| 3,199,348 | 8/1965 | Salera | 338/28 |
| 3,604,266 | 9/1971 | Chilton | 374/169 |
| 4,437,084 | 3/1984 | Clayton | 338/28 |
| 4,445,109 | 4/1984 | Naganoma | 338/28 |

Primary Examiner—Charles Frankfort
Assistant Examiner—Denis E. Corr
Attorney, Agent, or Firm—Thomas H. Murray

[57] ABSTRACT

A thermistor-type liquid level probe formed entirely of corrosive-resistant material and having characteristics which make it highly reliable in service. The probe is particularly adapted for use in measuring the liquid level of corrosive liquids such as acids.

2 Claims, 4 Drawing Figures

THERMISTOR LIQUID-LEVEL SENSING PROBE

BACKGROUND OF THE INVENTION

While suitable for detecting any liquid level, the liquid-level indicating probe of the invention is particularly adapted for use in sensing the level of corrosive liquids in a tank or other container.

As is known, thermistors are semiconductors whose resistance varies as a function of temperature. In the past, thermistor-type liquid level detectors have been provided wherein several thermistors are spaced along the height of a tank. Each thermistor is supplied with a small electrical current which heats it. When the thermistor is immersed in a liquid, its temperature is different than when it is exposed to air due to a difference in the heat dissipation effect. As a result, the resistance of the thermistor undergoes a corresponding variation, depending upon whether it is immersed or exposed to the atmosphere. Assuming, therefore, that a number of thermistors are spaced along the height of a tank, those thermistors which are immersed will exhibit a different resistance value than those above the liquid level bath. This variation in resistance can be detected with suitable electrical circuitry to determine the location of the liquid level within the tank. Typical examples of such thermistor liquid-level probes are shown, for example, in U.S. Pat. Nos. 3,432,840 and 3,955,416.

SUMMARY OF THE INVENTION

In accordance with the present invention, a new and improved thermistor liquid-level sensing probe is provided which is particularly adapted for use in corrosive environments but which, at the same time, can be used to detect the presence or absence of any liquid. Aside from the thermistor itself and the electrical leads connected to it, the entire probe is formed from plastic material which will withstand highly-corrosive environments.

Specifically, there is provided a liquid-level indicating probe comprising an elongated body of plastic material, preferably cylindrical in configuration and formed from TEFLON (TM) or some other similar plastic material. Extending through the elongated body of plastic material is a longitudinally-extending bore which extends from the back of the body to its forward end; however, the bore does not project through a forward end of the body. Preferably, a thermally-conductive compound is deposited at the forward end of the bore and at the forward end of the cylindrical body. The thermistor is inserted into the bore such that it is in contact with the thermally-conductive compound and has the usual electrical leads which extend backwardly through the bore. These leads are inserted into a pair of blind bores in the rearward end of the cylindrical plastic body on either side of the aforesaid longitudinally-extending bore, these same blind bores receiving external leads connected to suitable indicating circuitry.

A sleeve of plastic material extends around the cylindrical elongated body of plastic material and projects backwardly from its rearward end. The portion of the sleeve extending beyond the rearward end of the elongated body is filled with an epoxy to seal the entire unit. Preferably, the forward end of the elongated body is conical in configuration such that drops of liquid will not adhere to it to give a false indication that the probe is immersed when, in fact, it is not.

The above and other objects and features of the invention will become apparent from the following detailed description taken in conjunction with the accompanying drawings which form a part of this specification, and in which.

Figure 1:
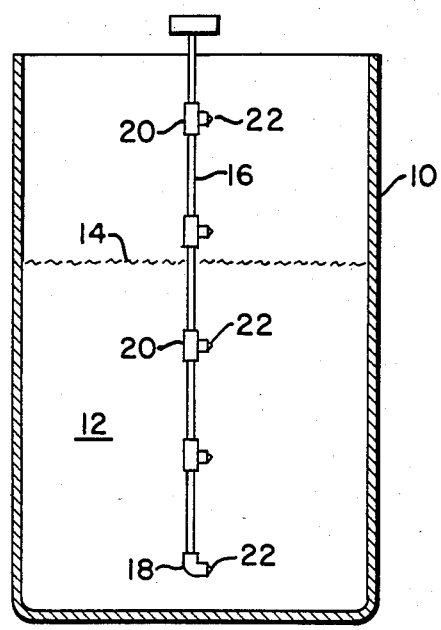
FIG. 1 is an illustration of a liquid-level tank incorporating the thermistor liquid-level probes of the invention.

With reference now to the drawings, and particularly to FIG. 1, there is shown a tank 10 containing a liquid bath 12, the upper level of the bath being indicated by the reference numeral 14. Extending downwardly into the bath 12 is an elongated tubular pipe 16 having an elbow 18 at its lower end and tee joints 20 spaced along its length. The elbow 18 and each of the tee joints 20, in turn, carries one of the thermistor sensing probes 22 of the invention. Probes 22, in turn, are connected to suitable electrical indicating circuitry, an example of which will be described hereinafter.

As was explained above, the resistance of those thermistors immersed in the bath 12 will be different than those above the liquid level 14, which are exposed to the atmosphere. This change in resistance can be detected to determine the location of the liquid level 14 due to the fact that those thermistors above the level 14 will have a different resistance than those below the level which are immersed in the bath 12.

Figure 2:
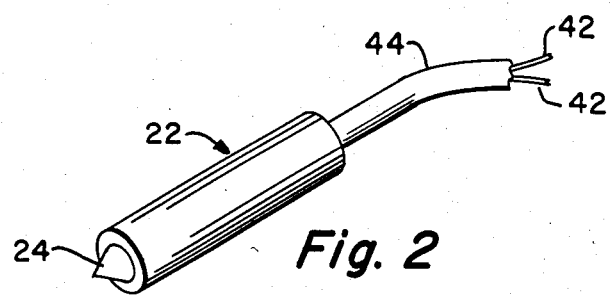
FIG. 2 is a perspective view of the probe of the invention.
Figure 3:
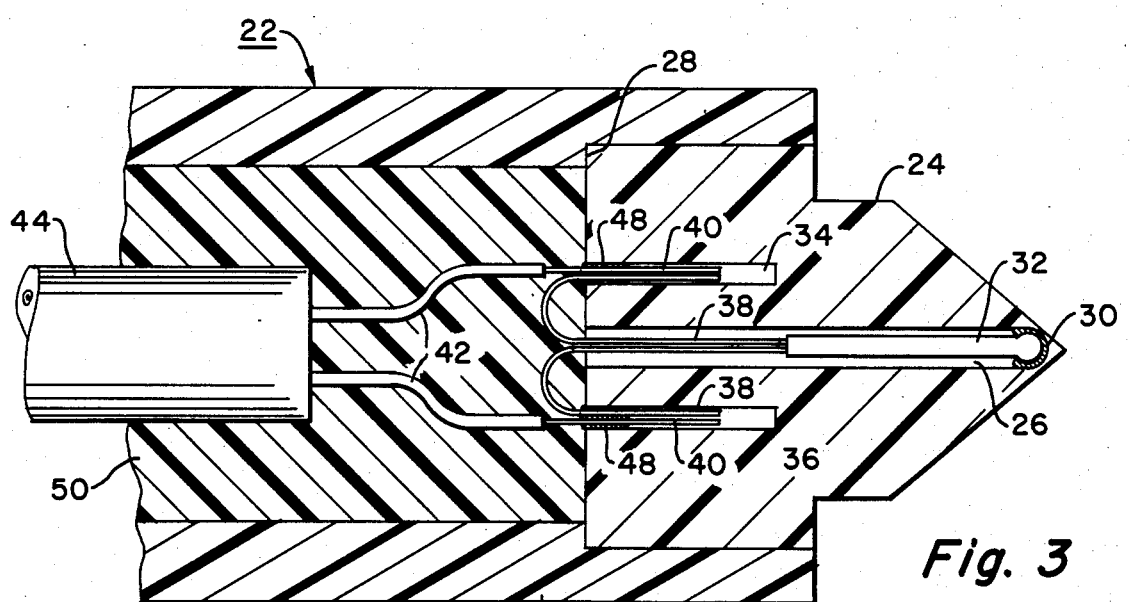
FIG. 3 is a cross-sectional view of the probe of the invention.

With reference now to FIGS. 2 and 3, each probe 22 includes a forward tip 24 formed from TEFLON (TM) or some other plastic material highly resistant to corrosion. The tip 24 is generally elongated as shown and is provided with a longitudinally-extending bore 26 therein. The bore 26 extends from the rearward surface 28 of the tip 24 to its forward end but does not pass through the forward end. A small droplet of a conductive compound 30 (e.g., silicone grease such as that sold by Tandy Corp., Fort Worth, Tex. as a heat-sink compound. Cat. No. 276-1372) is deposited in the forward end of the bore 26. Since the tip is smaller than the cross section of FIG. 3, this can be accomplished with the use of a hypodermic needle or the like. A thermistor 32 is inserted into the bore 26 such that its forward tip or end is in thermal contact with the compound 30.

On either side of the longitudinally-extending bore 26 are two blind bores 34 and 36 which receive the respective electrical conductors 38 from the thermistor 32. Also received within the bores 34 are the stripped ends 40 of electrical conductors 42 leading to electrical circuitry. As best shown in FIG. 2, the electrical conductors 42 are preferably carried within a surrounding sheath 44.

Surrounding the elongated tip 24 is an outer sleeve 46 of plastic material, preferably chlorinated polyvinyl chloride, but in any event formed from material which is highly resistant to a corrosive environment. The tip 24 is pressed into the forward portion of the sleeve 46 which extends backwardly from the rearward surface 28 to at least partially encircle the sheath 44. The chlorinated polyvinyl chloride sleeve 46 does not have good heat transfer characteristics as does the TEFLON tip but it is bondable into a fitting 18, 20; whereas TEF- LON is not. Also, the machinability of the chlorinated polyvinyl chloride is very poor; whereas that of TEFLON is very good, which facilitates shaping and drilling of the tip. Both plastic materials are highly resistant to corrosion. Leads 38 and 40 are soldered as at 48; and after they are thus soldered in this manner, the portion of the sleeve 46 extending backwardly from the rearward surface 28 is filled with a suitable epoxy 50 in a matrix which encapsulates the leads 38, 40 and 42. The epoxy 50 is preferably E-BOND (TM); while the tip 24 is formed from virgin TEFLON (TM). An important feature of the invention resides in the fact that the forward end of the tip 24 is machined so as to be conical. This prevents the retention of water droplets on the tip which might otherwise give a false indication to the effect that the tip is immersed.

Figure 4:
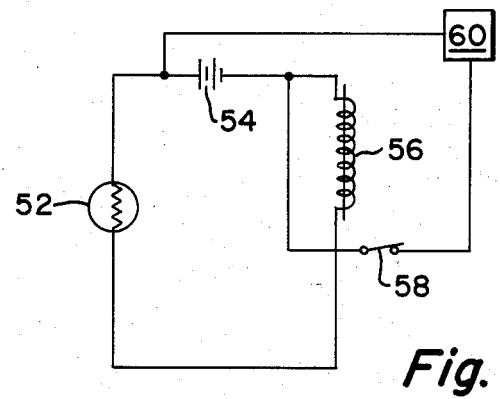
FIG. 4 is an example of a typical, common simple indicating circuit to which the thermistor of the probe of FIGS. 2 and 3 may be connected.

One possible simple circuit to which a thermistor can be connected is shown in FIG. 4 where the thermistor itself is indicated by the reference numeral 52. The thermistor is connected in series as shown with a battery 54 and a relay coil 56. Current from the battery 54 will pass through thermistor 52, causing it to generate heat. When the temperature of the thermistor 52 changes, as when the tip of FIGS. 2 and 3 becomes immersed in a liquid bath, current through the thermistor will also vary. Assuming that the resistance drops, current will increase to energize relay coil 56 which, in the particular embodiment shown in FIG. 4, causes normally-closed contacts 58 to open. This condition, in turn, is indicated on a suitable indicating device 60. For example, there can be one indicating device for each of the probes 22 shown in FIG. 1. Assuming that the indicators 60 are lamps, those lamps for the probes above the liquid level 14 may be energized, for example, while those below are deenergized. It is known, therefore, that in the specific example given in FIG. 1, the liquid level 14 is between the second and third probes from the top.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A liquid-level indicating probe comprising an elongated body of plastic material having a longitudinally-extending bore therein which extends from a back end of the body to a forward generally conical end closely adjacent the apex thereof without projecting through the forward end, a thermistor inserted into said bore and having electrical leads extending backwardly through said bore, a non-hardening, thermally-conductive compound holding said thermistor to the forwardmost walls of said bore at the end of said bore and adjacent said conical forward end and in direct thermal contact therewith, and a sleeve of plastic material extending around said elongated body of plastic material while leaving a tip at the forward end of said elongated body exposed for contact with a liquid bath whose level is to be indicated, the thermistor having a resistivity which is different when said forward tip is in contact with a liquid than when the tip is exposed to the atmosphere; a pair of blind bores in the back end of said body of plastic material on either side of said longitudinally-extending bore, said blind bores receiving the respective electrical leads from said thermistor and being in electrical contact with external leads also inserted into the blind bores wherein said sleeve of plastic material extends backwardly beyond the rearward end of said body of plastic material, and an epoxy material disposed within the portion of said sleeve extending beyond the rearward end of the body to seal and embed said electrical leads into a matrix formed by said epoxy material at points external to said body.

2. A liquid-level indicating probe comprising an elongated body of plastic material having a longitudinally-extending bore therein which extends from the back of the body to a forward end closely adjacent the forward terminal end of the body without projecting through the forward end of the body, a thermistor inserted into said bore having electrical leads extending backwardly through said bore and having external leads connected within said body in blind bores of said body to said leads of said thermistor, said external and thermistor leads being sealed and embedded by epoxy material molded about said leads at points adjacent and external said body, and a thermally-conductive compound at the forward end of said bore and in thermal engagement with the forward end of said elongated body, said thermistor being in contact with said thermally-conductive compound.

* * * * *